Figure 1:

June 19, 1923.

L. T. FREDERICK 1,458,931

METHOD OF FORMING ANNULAR BODIES

Filed Nov. 4, 1918

WITNESSES:
J.P.Wurmb.
O.E.Bee.

INVENTOR
Louis T. Frederick.
BY
Wesley G. Carr
ATTORNEY

Patented June 19, 1923.

1,458,931

UNITED STATES PATENT OFFICE.

LOUIS T. FREDERICK, OF WILKINSBURG, PENNSYLVANIA, ASSIGNOR TO WESTINGHOUSE ELECTRIC & MANUFACTURING COMPANY, A CORPORATION OF PENNSYLVANIA.

METHOD OF FORMING ANNULAR BODIES.

Application filed November 4, 1918. Serial No. 261,120.

*To all whom it may concern:*

Be it known that I, LOUIS T. FREDERICK, a citizen of the United States, and a resident of Wilkinsburg, in the county of Allegheny and State of Pennsylvania, have invented a new and useful Improvement in Methods of Forming Annular Bodies, of which the following is a specification.

My invention relates to methods of forming annular bodies such, for instance, as washers, tubes, bushings and gear blanks by employing strands of fibrous material impregnated with a suitable binder. The primary object of my invention is to construct articles, of the above mentioned character, which shall possess unusual mechanical strength and good insulating properties.

Heretofore, washers have been constructed by employing suitable sheet material and cutting or punching therefrom pieces of desirable shape to be stacked and compressed, the material being impregnated with a suitable binder and pressed and heated in a mold to compact the material and harden the binder. Although this method of forming washers has many advantages, it is open to criticism on account of the fact that the washers thus formed tend to dish and the laminations to separate under excessive strains. This method is also open to the objection of waste material which is unavoidable when the sheet material is cut into the desired shape. In view of this, one object of my invention is to construct washers which shall possess the mechanical strength of a laminated body and, at the same time, be highly resistant to any strains tending to dish them and separate their component parts. Furthermore, I contemplate a saving of material over methods employed heretofore.

Another object of my invention is to provide washers, tubes and the like which shall be unaffected by moisture, wide temperature changes, oils and weak acids.

A still further object of my invention is the construction of washers, tubes and the like by employing strands of material, impregnated with a binder, which may be machined and still maintain their mechanical strength.

With these and other objects in view, my invention will be more fully described, illustrated in the drawings, in the several views of which corresponding numerals indicate like parts, and then particularly pointed out in the claims.

Figure 2:
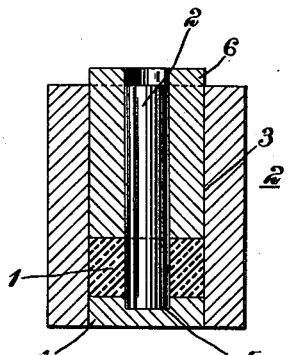
Figure 3:

In the drawings, Fig. 1 is a side view of a washer formed in accordance with my invention and in condition to be subjected to heat and pressure in a mold; Fig. 2 is a vertical, sectional view of a mold which may be employed in molding articles preformed in accordance with my invention, and Fig. 3 is a section of a V-ring, suitable for use in commutators, constructed in accordance with my invention.

I may construct tubes, washers and articles of like nature in accordance with my invention by employing strands of fibrous material and impregnating the strands with a suitable binder, after which they may be dried to facilitate their handling. The strands may then be wound, in a manner hereinafter set forth, to form the desired article. The formed article may then be placed in a mold of any suitable design and subjected to heat and pressure to compact the material and harden the binder.

In Fig. 1 is shown a preformed washer 1 constructed of windings of strands of fibrous material impregnated with a binder, such as a phenolic condensation product. The strands may be impregnated, before being wound, and dried to facilitate their handling, or they may be impregnated during the winding process, or the body may be formed of the windings of strands of fibrous material and the formed body impregnated with the binder. When forming the washer 1, a suitable mandrel 2 is employed and the strands of fibrous material may be wound helically, from end to end, first in one axial direction and then in the other, the convolutions of each winding, from one end to the other, being spaced, while each convolution of successive windings in the same axial direction engage each other. By this means, each layer, comprising a series of windings in one axial direction, has its convolutions crossing those of an adjacent layer comprising a series of windings in the opposite axial direction.

A body of the above described character may be wound automatically by machines of a standard type. The formed washer 1 is then disposed in a mold 2, having a cylindrical chamber 3, closed at one end by a bottom member 4, having a recess 5 adapted to receive and hold in place one end of the mandrel 2. When the mandrel 2 is placed in the mold so that one of its ends slips into the recess 5, the material surrounding it engages the removable bottom 4 and the inner face of the retaining wall of the mold 2. A pressure ring 6 may then be placed on the washer 1, and pressure may be applied to compact the material forming the washer. Heat may be applied, in any suitable manner, to first soften the binder with which the washer 1 is impregnated and to afterwards harden it.

A V-ring, such as is shown in Fig. 3, may be constructed in the manner above described by choosing a mold of suitable design so that the ultimate shape of the article may be acquired by pressure exerted on the material disposed in the mold, the material and the binder employed being of such nature that it flows readily when subjected to heat and pressure.

It is obvious that various articles may be constructed by employing a method within the scope of my invention and, for this reason, only two articles have been shown which may be constructed by employing such method. The nature of the winding employed, together with the use of a suitable binder, insures unusual mechanical strength in articles, such as washers, tubes and bushings, after they have been subjected to heat and pressure in a mold. The mechanical strength of such articles is supplemented by wearing qualities which have heretofore been unattainable in articles of a like nature.

In view of the fact that many articles may be constructed in accordance with my invention, I desire that no limitations shall be imposed, except such as those indicated in the appended claims.

I claim as my invention:

1. An article of manufacture comprising cord impregnated with a hardened phenolic condensation product and wound in such manner that windings of the cord advanced in one direction intercross, at definite intervals, with those disposed in another.

2. A molded article of manufacture comprising superposed cord impregnated with a hardened phenolic condensation product, the superposed cord being disposed in continuous layers in which the cord of one layer is intercrossed, at definite intervals, with that of an adjacent layer.

3. The method of constructing tubular bodies that comprises impregnating strands of fibrous material with a phenolic condensation product, drying the impregnated strands, winding the strands in such manner that strands wound in one direction intercross with strands wound in another to form the desired body and subjecting the body to heat and pressure in a mold.

4. The method of constructing annular bodies that comprises superposing convolutions of cord in such manner that strands wound in one direction intercross with strands wound in another to form the desired body, impregnating the body with a phenolic condensation product and subjecting the body to heat and pressure in a mold.

In testimony whereof, I have hereunto subscribed my name this 26th day of Oct. 1918.

LOUIS T. FREDERICK.